US012665247B2

(12) United States Patent　(10) Patent No.: US 12,665,247 B2
Isaka et al.　(45) Date of Patent: Jun. 23, 2026

(54) COPOLYMER, INJECTION MOLDED BODY, MEMBER TO BE COMPRESSED, AND COATED ELECTRICAL WIRE

(71) Applicant: DAIKIN INDUSTRIES, LTD., Osaka (JP)

(72) Inventors: Tadaharu Isaka, Osaka (JP); Yumi Zenke, Osaka (JP); Yukari Yamamoto, Osaka (JP); Hayato Tsuda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 493 days.

(21) Appl. No.: 18/192,298

(22) Filed: Mar. 29, 2023

(65) Prior Publication Data

US 2023/0235160 A1　Jul. 27, 2023

Related U.S. Application Data

(63) Continuation of application No. PCT/JP2021/036310, filed on Sep. 30, 2021.

(30) Foreign Application Priority Data

Sep. 30, 2020　(JP) ................................. 2020-166536

(51) Int. Cl.
| | |
|---|---|
| *H01M 50/193* | (2021.01) |
| *B29C 45/00* | (2006.01) |
| *C08F 114/26* | (2006.01) |
| *C08F 214/26* | (2006.01) |
| *C08L 27/18* | (2006.01) |
| *C09D 127/18* | (2006.01) |
| *C09D 127/20* | (2006.01) |
| *C09K 3/10* | (2006.01) |
| *H01B 3/44* | (2006.01) |
| *H01G 11/80* | (2013.01) |
| *H01M 50/176* | (2021.01) |
| *H01M 50/184* | (2021.01) |
| *H01M 50/188* | (2021.01) |
| *H01M 50/198* | (2021.01) |
| *B29K 27/18* | (2006.01) |

(52) U.S. Cl.
CPC ....... *H01M 50/193* (2021.01); *B29C 45/0001* (2013.01); *C08F 114/26* (2013.01); *C08F 214/262* (2013.01); *C08L 27/18* (2013.01); *C09D 127/18* (2013.01); *C09D 127/20* (2013.01); *C09K 3/1009* (2013.01); *H01B 3/445* (2013.01); *H01G 11/80* (2013.01); *H01M 50/176* (2021.01); *H01M 50/184* (2021.01); *H01M 50/188* (2021.01); *H01M 50/198* (2021.01); *B29K 2027/18* (2013.01); *C08L 2205/025* (2013.01)

(58) Field of Classification Search
CPC ................................................ C08F 214/262
See application file for complete search history.

(56) References Cited

U.S. PATENT DOCUMENTS

| | | | |
|---|---|---|---|
| 3,635,926 | A | 1/1972 | Gresham et al. |
| 3,945,786 | A | 3/1976 | Bishop |
| 4,029,868 | A | 6/1977 | Carlson |
| 4,262,101 | A | 4/1981 | Hartwimmer et al. |
| 4,414,356 | A | 11/1983 | Michel |
| 4,510,300 | A | 4/1985 | Levy |
| 4,743,658 | A | 5/1988 | Imbalzano et al. |
| 4,902,444 | A | 2/1990 | Kolouch |
| 5,000,875 | A | 3/1991 | Kolouch |
| 5,656,392 | A | 8/1997 | Sano et al. |
| 5,767,198 | A | 6/1998 | Shimizu et al. |
| 5,851,693 | A | 12/1998 | Sano et al. |
| 6,066,707 | A | 5/2000 | Colaianna et al. |
| 6,069,215 | A | 5/2000 | Araki et al. |
| 6,096,795 | A | 8/2000 | Abusleme et al. |
| 6,689,833 | B1 | 2/2004 | Bidstrup et al. |
| 6,713,183 | B2 | 3/2004 | Araki et al. |
| 6,740,375 | B1 | 5/2004 | Sagisaka et al. |
| 6,774,196 | B1 | 8/2004 | Taira et al. |
| 11,826,975 | B2 | 11/2023 | Imamura et al. |
| 2002/0011692 | A1 | 1/2002 | Lahijani |
| 2002/0099143 | A1 | 7/2002 | Namura |

(Continued)

FOREIGN PATENT DOCUMENTS

| | | |
|---|---|---|
| CN | 1599757 A | 3/2005 |
| CN | 103946250 A | 7/2014 |

(Continued)

OTHER PUBLICATIONS

Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.

(Continued)

*Primary Examiner* — Catherine S Branch
(74) *Attorney, Agent, or Firm* — Sughrue Mion, PLLC

(57) ABSTRACT

A copolymer containing a tetrafluoroethylene unit, and a perfluoro(propyl vinyl ether) unit, wherein the copolymer has a content of the perfluoro(propyl vinyl ether) unit of 3.4 to 3.9% by mass with respect to the whole of the monomer units, and a melt flow rate of 29 to 36 g/10 min, and the number of functional groups of $-CF=CF_2$, $-CF_2H$, $-COF$, $-COOH$, $-COOCH_3$, $-CONH_2$ and $-CH_2OH$ of more than 50 per $10^6$ main-chain carbon atoms. Also disclosed is a sealing tool, an injection molded article, a member to be compressed including the copolymer, and a coated electric wire including a coating layer containing the copolymer.

5 Claims, No Drawings

(56) References Cited

U.S. PATENT DOCUMENTS

| | | |
|---|---|---|
| 2002/0167115 A1 | 11/2002 | Tanaka |
| 2003/0013791 A1 | 1/2003 | Blong et al. |
| 2003/0109646 A1 | 6/2003 | Kubo et al. |
| 2003/0114615 A1 | 6/2003 | Sumi et al. |
| 2003/0190530 A1 | 10/2003 | Yang et al. |
| 2003/0216531 A1 | 11/2003 | Aten et al. |
| 2004/0072935 A1 | 4/2004 | Blong et al. |
| 2004/0102572 A1 | 5/2004 | Kubo et al. |
| 2004/0204536 A1 | 10/2004 | Miyatani et al. |
| 2004/0260044 A1 | 12/2004 | Earnest, Jr. et al. |
| 2005/0020792 A1 | 1/2005 | Aoyama et al. |
| 2005/0245626 A1 | 11/2005 | Hoaglund et al. |
| 2007/0112155 A1 | 5/2007 | Takase et al. |
| 2007/0149734 A1 | 6/2007 | Sakakibara et al. |
| 2007/0281166 A1 | 12/2007 | Nishio |
| 2007/0292685 A1 | 12/2007 | Brothers et al. |
| 2008/0038627 A1 | 2/2008 | Yamauchi et al. |
| 2008/0114143 A1 | 5/2008 | Brothers et al. |
| 2008/0241534 A1 | 10/2008 | Ohtani et al. |
| 2009/0038821 A1 | 2/2009 | Sato et al. |
| 2009/0044965 A1 | 2/2009 | Kono et al. |
| 2009/0176952 A1 | 7/2009 | Funaki et al. |
| 2009/0246435 A1 | 10/2009 | Shimono et al. |
| 2010/0063214 A1 | 3/2010 | Kasahara et al. |
| 2010/0212929 A1 | 8/2010 | Ishii et al. |
| 2010/0273047 A1 | 10/2010 | Kunoike et al. |
| 2010/0314153 A1 | 12/2010 | Ishii et al. |
| 2010/0314154 A1 | 12/2010 | Kitahara et al. |
| 2011/0052970 A1 | 3/2011 | Kurata et al. |
| 2011/0052977 A1 | 3/2011 | Kurata et al. |
| 2011/0104562 A1 | 5/2011 | Byun et al. |
| 2011/0203830 A1 | 8/2011 | Kono et al. |
| 2011/0272173 A1 | 11/2011 | Shiotsuki et al. |
| 2012/0035329 A1 | 2/2012 | Isogai et al. |
| 2012/0064273 A1 | 3/2012 | Bacino |
| 2012/0094169 A1 | 4/2012 | Kim et al. |
| 2013/0046058 A1 | 2/2013 | Pham et al. |
| 2013/0130100 A1 | 5/2013 | Kurata et al. |
| 2014/0227533 A1 | 8/2014 | Murakami et al. |
| 2014/0287177 A1 | 9/2014 | Suda et al. |
| 2014/0378616 A1 | 12/2014 | Nakano et al. |
| 2015/0041145 A1 | 2/2015 | Colaianna et al. |
| 2015/0148481 A1 | 5/2015 | Brothers et al. |
| 2015/0158988 A1 | 6/2015 | Sawaki et al. |
| 2015/0353700 A1 | 12/2015 | Isaka et al. |
| 2016/0006004 A1 | 1/2016 | Ogawa et al. |
| 2016/0078979 A1 | 3/2016 | Hosoda et al. |
| 2016/0108159 A1 | 4/2016 | Sekiguchi et al. |
| 2016/0194491 A1 | 7/2016 | Taguchi et al. |
| 2016/0272805 A1 | 9/2016 | Nakanishi et al. |
| 2016/0319089 A1 | 11/2016 | Imamura et al. |
| 2016/0322128 A1 | 11/2016 | Imamura et al. |
| 2016/0340455 A1 | 11/2016 | Abe et al. |
| 2017/0008986 A1 | 1/2017 | Isaka et al. |
| 2017/0025204 A1 | 1/2017 | Chapman et al. |
| 2017/0154707 A1 | 6/2017 | Abe et al. |
| 2017/0214037 A1 | 7/2017 | Uematsu et al. |
| 2017/0260344 A1 | 9/2017 | Imamura et al. |
| 2018/0009204 A1 | 1/2018 | Higuchi et al. |
| 2018/0036931 A1 | 2/2018 | Higuchi et al. |
| 2018/0237566 A1 | 8/2018 | Aida et al. |
| 2018/0265654 A1 | 9/2018 | Imamura et al. |
| 2018/0283590 A1 | 10/2018 | Yokoyama et al. |
| 2019/0134939 A1 | 5/2019 | Colaianna et al. |
| 2019/0143628 A1 | 5/2019 | Colaianna et al. |
| 2019/0177453 A1 | 6/2019 | Isaka et al. |
| 2019/0193315 A1 | 6/2019 | Miyamoto et al. |
| 2019/0375929 A1 | 12/2019 | Nishimura et al. |
| 2019/0382544 A1 | 12/2019 | Yokotani et al. |
| 2020/0332037 A1 | 10/2020 | Isaka et al. |
| 2021/0008827 A1 | 1/2021 | Colaianna et al. |
| 2021/0008828 A1 | 1/2021 | Colaianna et al. |
| 2021/0024709 A1 | 1/2021 | Fukushima et al. |
| 2021/0024769 A1 | 1/2021 | Imamura et al. |
| 2021/0189031 A1 | 6/2021 | Hintzer et al. |
| 2021/0269568 A1 | 9/2021 | Imamura et al. |
| 2022/0001657 A1 | 1/2022 | Kikuchi et al. |
| 2022/0033636 A1 | 2/2022 | Nishimura et al. |
| 2022/0170573 A1 | 6/2022 | Imamura et al. |
| 2022/0181689 A1 | 6/2022 | Isaka et al. |
| 2022/0181698 A1 | 6/2022 | Isaka et al. |
| 2022/0181729 A1 | 6/2022 | Isaka et al. |
| 2022/0195088 A1 | 6/2022 | Imamura et al. |
| 2022/0213996 A1 | 7/2022 | Imamura et al. |
| 2022/0266485 A1 | 8/2022 | Tsuda et al. |
| 2022/0278403 A1 | 9/2022 | Tsuda et al. |
| 2023/0227594 A1 | 7/2023 | Yamamoto et al. |
| 2023/0235107 A1 | 7/2023 | Isaka et al. |
| 2023/0235159 A1 | 7/2023 | Isaka et al. |
| 2023/0238627 A1 | 7/2023 | Isaka et al. |
| 2023/0238628 A1 | 7/2023 | Zenke et al. |
| 2023/0238629 A1 | 7/2023 | Isaka et al. |
| 2023/0272136 A1 | 8/2023 | Zenke et al. |
| 2023/0295356 A1 | 9/2023 | Isaka et al. |
| 2023/0344077 A1 | 10/2023 | Qiu et al. |
| 2023/0383031 A1 | 11/2023 | Isaka et al. |
| 2023/0383032 A1 | 11/2023 | Isaka et al. |
| 2023/0383033 A1 | 11/2023 | Zenke et al. |
| 2023/0383034 A1 | 11/2023 | Isaka et al. |
| 2023/0390977 A1 | 12/2023 | Hamada et al. |
| 2023/0390978 A1 | 12/2023 | Tsuda et al. |
| 2023/0390979 A1 | 12/2023 | Tsuda et al. |
| 2023/0390980 A1 | 12/2023 | Tsuda et al. |
| 2023/0390981 A1 | 12/2023 | Tsuda et al. |
| 2023/0391909 A1 | 12/2023 | Isaka et al. |
| 2023/0391910 A1 | 12/2023 | Isaka et al. |
| 2023/0391911 A1 | 12/2023 | Isaka et al. |
| 2023/0391912 A1 | 12/2023 | Isaka et al. |
| 2023/0391917 A1 | 12/2023 | Isaka et al. |
| 2023/0391920 A1 | 12/2023 | Isaka et al. |
| 2023/0391927 A1 | 12/2023 | Isaka |
| 2023/0391929 A1 | 12/2023 | Isaka et al. |
| 2023/0391931 A1 | 12/2023 | Isaka et al. |
| 2023/0391932 A1 | 12/2023 | Isaka et al. |
| 2023/0391933 A1 | 12/2023 | Isaka et al. |
| 2023/0392737 A1 | 12/2023 | Tsuda et al. |
| 2023/0395282 A1 | 12/2023 | Isaka et al. |
| 2023/0399431 A1 | 12/2023 | Isaka et al. |
| 2023/0399432 A1 | 12/2023 | Isaka et al. |
| 2023/0399438 A1 | 12/2023 | Isaka et al. |
| 2023/0399441 A1 | 12/2023 | Isaka et al. |
| 2023/0399443 A1 | 12/2023 | Isaka et al. |
| 2023/0406975 A1 | 12/2023 | Isaka et al. |
| 2023/0406976 A1 | 12/2023 | Isaka et al. |
| 2023/0411751 A1 | 12/2023 | Tsuda et al. |
| 2023/0415387 A1 | 12/2023 | Hamada et al. |
| 2025/0002728 A1 | 1/2025 | Zenke et al. |
| 2025/0011488 A1 | 1/2025 | Isaka et al. |
| 2025/0011490 A1 | 1/2025 | Isaka et al. |
| 2025/0011494 A1 | 1/2025 | Isaka et al. |
| 2025/0011496 A1 | 1/2025 | Yamamoto et al. |
| 2025/0011498 A1 | 1/2025 | Isaka et al. |
| 2025/0011499 A1 | 1/2025 | Isaka et al. |
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 109476061 A | 3/2019 |
| CN | 110712348 A | 1/2020 |
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 260 526 A1 | 11/2002 |
| EP | 1 462 458 A1 | 9/2004 |
| EP | 3 816 214 A1 | 5/2021 |

(56)  References Cited

FOREIGN PATENT DOCUMENTS

| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-158456 A | 6/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2013-0069652 A1 | 6/2013 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2019/187725 A1 | 10/2019 |
| WO | 2019/189316 A1 | 10/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 9/2022 |
| WO | 2022/181231 A1 | 9/2022 |
| WO | 2022/181232 A1 | 9/2022 |

OTHER PUBLICATIONS

Translation of the International Search Report dated Jun. 6, 2023 in International Application No. PCT/JP2023/013332.

Translation of the International Search Report dated Jun. 6, 2023 in International Application No. PCT/JP2023/013333.

Translation of the International Search Report dated Jun. 20, 2023 in International Application No. PCT/JP2023/013290.

European Search Report issued Oct. 20, 2023 for European Patent Application No. 20 856 953.3.

European Search Report issued Oct. 20, 2023 for European Patent Application No. 20 857 574.6.

European Search Report issued Oct. 20, 2023 for European Patent Application No. 20 857 843.5.

European Search Report issued Oct. 20, 2023 for European Patent Application No. 20 857 470.7.

Extended European Search Report issued Aug. 2, 2023 in European Application No. 20857704.9.

International Preliminary Report on Patentability dated Aug. 29, 2023 with a Translation of the Written Opinion of the International Searching Authority in Application No. PCT/JP2022/003634.

International Preliminary Report on Patentability dated Aug. 29, 2023 with a Translation of the Written Opinion of the International Searching Authority in Application No. PCT/JP2022/003635.

International Preliminary Report on Patentability dated Aug. 29, 2023 with a Translation of the Written Opinion of the International Searching Authority in Application No. PCT/JP2022/003636.

(56) References Cited

OTHER PUBLICATIONS

International Preliminary Report on Patentability dated Aug. 29, 2023 with a Translation of the Written Opinion of the International Searching Authority in Application No. PCT/JP2022/003637.
International Preliminary Report on Patentability dated Aug. 29, 2023 with a Translation of the Written Opinion of the International Searching Authority in Application No. PCT/JP2022/003638.
International Preliminary Report on Patentability dated Aug. 29, 2023 with a Translation of the Written Opinion of the International Searching Authority in Application No. PCT/JP2022/003640.
International Preliminary Report on Patentability dated Aug. 29, 2023 with a Translation of the Written Opinion of the International Searching Authority in Application No. PCT/JP2022/003641.
International Preliminary Report on Patentability dated Aug. 29, 2023 with a Translation of the Written Opinion of the International Searching Authority in Application No. PCT/JP2022/003642.
International Preliminary Report on Patentability dated Aug. 29, 2023 with a Translation of the Written Opinion of the International Searching Authority in Application No. PCT/JP2022/003643.
International Preliminary Report on Patentability dated Aug. 29, 2023 with a Translation of the Written Opinion of the International Searching Authority in Application No. PCT/JP2022/003644.
International Preliminary Report on Patentability dated Aug. 29, 2023 with a Translation of the Written Opinion of the International Searching Authority in Application No. PCT/JP2022/003645.
International Preliminary Report on Patentability dated Aug. 29, 2023 with a Translation of the Written Opinion of the International Searching Authority in Application No. PCT/JP2022/003646.
International Preliminary Report on Patentability dated Aug. 29, 2023 with a Translation of the Written Opinion of the International Searching Authority in Application No. PCT/JP2022/003647.
International Preliminary Report on Patentability dated Aug. 29, 2023 with a Translation of the Written Opinion of the International Searching Authority in Application No. PCT/JP2022/003648.
International Preliminary Report on Patentability dated Aug. 29, 2023 with a Translation of the Written Opinion of the International Searching Authority in Application No. PCT/JP2022/003649.
International Preliminary Report on Patentability dated Aug. 29, 2023 with a Translation of the Written Opinion of the International Searching Authority in Application No. PCT/JP2022/003650.
International Preliminary Report on Patentability dated Aug. 29, 2023 with a Translation of the Written Opinion of the International Searching Authority in Application No. PCT/JP2022/003651.
International Preliminary Report on Patentability dated Aug. 29, 2023 with a Translation of the Written Opinion of the International Searching Authority in Application No. PCT/JP2022/003652.
International Preliminary Report on Patentability dated Aug. 29, 2023 with a Translation of the Written Opinion of the International Searching Authority in Application No. PCT/JP2022/003653.
International Preliminary Report on Patentability dated Aug. 29, 2023 with a Translation of the Written Opinion of the International Searching Authority in Application No. PCT/JP2022/003654.
International Preliminary Report on Patentability dated Aug. 29, 2023 with a Translation of the Written Opinion of the International Searching Authority in Application No. PCT/JP2022/003657.
International Preliminary Report on Patentability dated Aug. 29, 2023 with a Translation of the Written Opinion of the International Searching Authority in Application No. PCT/JP2022/003658.
International Preliminary Report on Patentability dated Aug. 29, 2023 with a Translation of the Written Opinion of the International Searching Authority in Application No. PCT/JP2022/003659.
International Preliminary Report on Patentability dated Aug. 29, 2023 with a Translation of the Written Opinion of the International Searching Authority in Application No. PCT/JP2022/003660.
International Preliminary Report on Patentability dated Aug. 29, 2023 with a Translation of the Written Opinion of the International Searching Authority in Application No. PCT/JP2022/003661.
International Preliminary Report on Patentability dated Aug. 29, 2023 with a Translation of the Written Opinion of the International Searching Authority in Application No. PCT/JP2022/003664.
International Preliminary Report on Patentability dated Aug. 29, 2023 with a Translation of the Written Opinion of the International Searching Authority in Application No. PCT/JP2022/003665.
International Preliminary Report on Patentability dated Aug. 29, 2023 with a Translation of the Written Opinion of the International Searching Authority in Application No. PCT/JP2022/007735.
International Preliminary Report on Patentability dated Aug. 29, 2023 with a Translation of the Written Opinion of the International Searching Authority in Application No. PCT/JP2022/007737.
International Preliminary Report on Patentability dated Aug. 29, 2023 with a Translation of the Written Opinion of the International Searching Authority in Application No. PCT/JP2022/007738.
U.S. Appl. No. 17/679,789, filed Feb. 24, 2022, Isaka, et al., cont of PCT/JP2020/032238.
U.S. Appl. No. 17/679,831, filed Feb. 24, 2022, Isaka, et al., cont of PCT/JP2020/032239.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/192,101, filed Mar. 29, 2023, Yamamoto, et al., cont of PCT/JP2021/036305.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.

(56) References Cited

OTHER PUBLICATIONS

U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.
U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
International Search Report issued Oct. 13, 2020 in International Application No. PCT/JP2020/032236.
International Search Report issued Oct. 13, 2020 in International Application No. PCT/JP2020/032237.
International Search Report issued Oct. 13, 2020 in International Application No. PCT/JP2020/032238.
International Search Report issued Oct. 13, 2020 in International Application No. PCT/JP2020/032239.
International Search Report dated Oct. 6, 2020 in International Application No. PCT/JP2020/032234.
International Preliminary Report on Patentability with Written Opinion dated Mar. 1, 2022 in International Application No. PCT/JP2020/032238.
International Preliminary Report on Patentability with Written Opinion dated Mar. 1, 2022 in International Application No. PCT/JP2020/032239.
International Preliminary Report on Patentability with Written Opinion dated Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability with Written Opinion dated Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 9, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.

Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.

(56) References Cited

OTHER PUBLICATIONS

International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.

International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
U.S. Appl. No. 18/192,298, filed Mar. 29, 2029, Isaka et al., cont of PCT/JP2021/036310.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al, "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).

(56)     References Cited

OTHER PUBLICATIONS

European Search Report issued Feb. 10, 2025 for European Patent Application No. 22759283.9.
European Search Report issued Feb. 20, 2025 for European Patent Application No. 22759263.1.
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

COPOLYMER, INJECTION MOLDED BODY, MEMBER TO BE COMPRESSED, AND COATED ELECTRICAL WIRE

CROSS-REFERENCE TO RELATED APPLICATIONS

This application is a Rule 53(b) Continuation of International Application No. PCT/JP2021/036310 filed Sep. 30, 2021, which claims priority based on Japanese Patent Application No. 2020-166536 filed Sep. 30, 2020, the respective disclosures of which are incorporated herein by reference in their entirety.

TECHNICAL FIELD

The present disclosure relates to a copolymer, an injection molded article, a member to be compressed and a coated electric wire.

BACKGROUND ART

Patent Document 1 describes a cultivating vessel characterized in that at least a part thereof is composed of a fluorine-containing meltable resin.

RELATED ART

Patent Document

Patent Document 1: Japanese Patent Laid-Open No. 06-040813

SUMMARY

According to the present disclosure, there is provided a copolymer comprising tetrafluoroethylene unit, and a perfluoro(propyl vinyl ether) unit, wherein the copolymer has a content of the perfluoro(propyl vinyl ether) unit of 3.4 to 3.9% by mass with respect to the whole of the monomer units, and a melt flow rate of 29 to 36 g/10 min.

EFFECTS

According to the present disclosure, there can be provided a copolymer from which injection molded articles excellent in the surface smoothness can be obtained by injection molding in a high productivity; a coating layer with few defects can be obtained; and molded articles very excellent in the water vapor low permeability and excellent in the sealability at high temperatures, and even in the case of contacting with chemicals, hardly causing cracks, can be obtained.

DESCRIPTION OF EMBODIMENTS

Hereinafter, specific embodiments of the present disclosure will be described in detail, but the present disclosure is not limited to the following embodiments.

A copolymer of the present disclosure contains tetrafluoroethylene (TFE) unit and a perfluoro(propyl vinyl ether) (PPVE) unit.

Patent Document 1 describes that there can be provided a cultivating vessel which does not allow sundry bacteria to enter into, has the good air permeability and the low moisture permeability, moreover has light transmissivity not inferior to glasses, and does not break, by forming the culturing vessel from a fluorine-containing meltable resin such as a tetrafluoroethylene/hexafluoropropylene copolymer or a tetrafluoroethylene/perfluoro(alkyl vinyl ether) copolymer.

On the other hand, it has become clear that when by using a conventional fluorine-containing meltable resin, a cap of a storage container for fermented food is prepared, it is difficult for both the excellent water vapor low permeability, and the sealability at high temperatures to be simultaneously satisfied. Further, it has become clear that although on a small cap, small screw threads need to be famed, it is also difficult the conventional fluorine-containing meltable resin to simultaneously satisfy both the injection moldability for forming the small screw threads, and the sealability and the crack resistance at high temperatures. Therefore, even though the cap famed by using the conventional fluorine-containing meltable resin has a sufficient water vapor low permeability and the small screw threads have been famed, there is such problems that on disinfection at high temperatures and repetition of opening/closing of the cap, the cap is damaged and the container cannot sufficiently be hermetically sealed.

It has been found that by suitably regulating the content of the PPVE unit and the melt flow rate (DER) of the copolymer containing the TEE unit and the PPVE unit, there are improved the injection moldability and the electric wire coatability of the copolymer, and by using such a copolymer, there can be obtained molded articles very excellent in the water vapor low permeability and excellent in the sealability at high temperatures, and even in the case of contacting with chemicals, hardly causing cracks.

The copolymer of the present disclosure is a melt-fabricable fluororesin. The being melt-fabricable means that it is possible to melt and process a polymer by using a conventional processing device such as an extruder or an injection molding machine.

The content of the PPVE unit of the copolymer is, with respect to the whole of the monomer units, 3.4 to 3.9% by mass, preferably 3.5% by mass or higher, and preferably 3.8% by mass or lower. Due to that the content of the PPVE unit of the copolymer is in the above range, there can be obtained molded articles excellent in the sealability at high temperatures, and even in the case of contacting with chemicals, hardly causing cracks.

The content of the TFE unit of the copolymer is, with respect to the whole of the monomer units, preferably 96.1 to 96.6% by mass and more preferably 96.5% by mass or lower, and more preferably 96.2% by mass or higher. Due to that the content of the TFE unit of the copolymer is in the above range, there can be obtained molded articles excellent in the sealability at high temperatures, and even in the case of contacting with chemicals, hardly causing cracks.

In the present disclosure, the content of each monomer unit in the copolymer is measured by a $^{19}$F-NMR method.

The copolymer can also contain a monomer unit originated from a monomer copolymerizable with TFE and PPVE. In this case, the content of the monomer unit copolymerizable with TFE and PPVE is, with respect to the whole of monomer units of the copolymer, preferably 0 to 4.0% by mass, more preferably 0.05 to 0.5% by mass and still more preferably 0.1 to 0.5% by mass.

The monomers copolymerizable with TFE and PPVE may include hexafluoropropylene (HEP), vinyl monomers represented by $CZ^1Z^2Z^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2=CF-$

3

OCH$_2$—Rf$^1$ wherein Rf$^1$ represents a perfluoroalkyl group having 1 to 5 carbon atoms. Among these, HEP is preferred.

The copolymer is preferably at least one selected from the group consisting of a copolymer consisting only of the TFE unit and the PPVE unit, and TEE/HEP/PPVE copolymer, and is more preferably a copolymer consisting only of the TFE unit and the PPVE unit.

The content of fluorine of the copolymer is preferably lower than 70% by mol, more preferably 69% by mol or lower, still more preferably 68% by mol or lower and especially preferably 67% by mol or lower, and preferably 65% by mol or higher and more preferably 66% by mass or higher. Due to that the content of fluorine of the copolymer is in the above range, there can be provided the copolymer from which injection molded articles better in the surface smoothness can be obtained by injection molding in a high productivity; a coating layer with few defects can be obtained; and molded articles much better in the water vapor low permeability and better in the sealability at high temperatures, and even in the case of contacting with chemicals, more hardly causing cracks, can be obtained.

The melt flow rate (MFR) of the copolymer is 29 to 36 g/10 min, preferably 30 g/10 min or higher and more preferably 31 g/10 min or higher, and preferably 35 g/10 min or lower and more preferably 34 g/10 min or lower. Due to that the MFR of the copolymer is in the above range, injection molded articles excellent in the surface smoothness can be obtained by injection molding in a high productivity, and a coating layer with few defects can be obtained. Further, molded articles very excellent in the water vapor low permeability and excellent in the sealability at high temperatures, and even in the case of contacting with chemicals, hardly causing cracks, can be obtained.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

4 meates. Further, the copolymer having the number of functional groups in the above range is easy in production and can be produced at a low cost. Even in the case where the number of functional groups of the copolymer is large, by regulating the content of the PPVE unit and the MFR of the copolymer, there can be obtained molded articles which can suppress the permeation of moisture in a higher level than conventional technologies. Therefore, in the case of forming a cap of a storage container by using the copolymer having a sufficient number of functional groups, carbon dioxide generated in the storage container can be made to permeate smoothly outside the storage container. Simultaneously, since the copolymer of the present disclosure has the excellent water vapor low permeability, by forming a cap of a storage container by using the copolymer, the drying of a sample such as fungi stored in the storage container can be suppressed while the detention of carbon dioxide in the storage container is suppressed.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.30 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the copolymer is calculated according to the following formula (A).

$$N = I \times K / t \qquad (A)$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | C$_7$F$_{15}$COF |
| —COOH free | 1815 | 530 | 439 | H(CF$_2$)$_6$COOH |
| —COOH bonded | 1779 | 530 | 439 | H(CF$_2$)$_6$COOH |
| —COOCH$_3$ | 1795 | 680 | 342 | C$_7$F$_{15}$COOCH$_3$ |
| —CONH$_2$ | 3436 | 506 | 460 | C$_7$H$_{15}$CONH$_2$ |
| —CH$_2$OH$_2$, —OH | 3648 | 104 | 2236 | C$_7$H$_{15}$CH$_2$OH |
| —CF$_2$H | 3020 | 8.8 | 26485 | H(CF$_2$CF$_2$)$_3$CH$_2$OH |
| —CF=CF$_2$ | 1795 | 635 | 366 | CF$_2$=CF$_2$ |

The number of functional groups of the copolymer per $10^6$ main-chain carbon atoms thereof is usually more than 50, preferably 75 or more, more preferably 100 or more and still more preferably 150 or more; and the upper limit is not limited, but may be 800 or less. By regulating the content of the PPVE unit and the melt flow rate (DER) of the copolymer, and introducing a sufficient number of functional groups to the copolymer, the carbon dioxide permeability coefficient of the copolymer is raised and there can be obtained molded articles which carbon dioxide easily per- Absorption frequencies of —CH$_2$CF$_2$H, —CH$_2$COF, —CH$_2$COOH, —CH$_2$COOCH$_3$ and —CH$_2$CONH$_2$ are lower by a few tens of kaysers (cm$^{-1}$) than those of —CF$_2$H, —COF, —COOH free and —COOH bonded, —COCCH$_3$ and —CONH$_2$ shown in the Table, respectively.

For example, the number of the functional group —COF is the total of the number of a functional group determined from an absorption peak having an absorption frequency of 1,883 cm$^{-1}$ derived from —CF$_2$COF and the number of a functional group determined from an absorption peak having an absorption frequency of 1,840 cm$^{-1}$ derived from —CH$_2$COF.

The functional groups are ones present on main chain terminals or side chain terminals of the copolymer, and ones present in the main chain or the side chains. The number of the functional groups may be the total of numbers of —CFCF$_2$, —CF$_2$H, —COF, —COOH, —COOCH$_3$, —CONH$_2$ and —CH$_2$OH.

The functional groups are introduced to the copolymer by, for example, a chain transfer agent or a polymerization initiator used for production of the copolymer. For example, in the case of using an alcohol as the chain transfer agent, or a peroxide having a structure of —CH$_2$OH as the polymerization initiator, —CH$_2$OH is introduced on the main chain terminals of the copolymer. Alternatively, the functional group is introduced on the side chain terminal of the copolymer by polymerizing a monomer having the functional group.

By subjecting such a copolymer having functional groups to a fluorination treatment, the number of the functional groups is reduced. That is, it is preferable that the copolymer is one having been subjected to no fluorination treatment. It is also preferable that the copolymer is one having been subjected to no stabilization treatment such as ammonia treatment.

The melting point of the copolymer is preferably 306 to 315° C. and more preferably 306 to 313° C. Due to that the melting point is in the above range, there can be obtained the copolymer giving molded articles better in the crack resistance at high temperatures and the sealability at high temperatures.

In the present disclosure, the melting point can be measured by using a differential scanning calorimeter [DSC].

The glass transition temperature (Tg) of the copolymer is preferably 90° C. or higher, more preferably 95° C. or higher and still more preferably 96° C. or higher, and preferably 100° C. or lower and more preferably 99° C. or lower. Since the copolymer of the present disclosure can have such a high glass transition temperature, there can be obtained the copolymer giving molded articles exhibiting the excellent heat resistance and better in the crack resistance at high temperatures and the sealability at high temperatures.

In the present disclosure, the glass transition temperature can be measured by a dynamic viscoelasticity measurement.

The water vapor permeability of the copolymer is preferably 8.2 g·cm/m$^2$ or lower and more preferably 8.1 g·cm/m$^2$ or lower. Due to that the content of the PPVE unit and the melt flow rate (DER) of the copolymer containing the TFE unit and the PPVE unit are suitably regulated, the copolymer has remarkably excellent water vapor low permeability.

In the present disclosure, the water vapor permeability can be measured under the condition of a temperature of 95° C. and for 30 days. Specific measurement of the water vapor permeability can be carried out by a method described in Examples.

The copolymer of the present disclosure can give molded articles excellent in the sealability at high temperatures. The sealability at high temperatures can be evaluated by measuring the storage elastic modulus (E') at 150° C., the amount of recovery at 150° C. and the surface pressure at 150° C. The copolymer high in the storage elastic modulus (E') at 150° C. and large in the amount of recovery at 150° C. can continuously exhibit a sufficient rebound resilience also at high temperatures for a long tam. Further, the copolymer high in the surface pressure at 150° C. can give molded articles excellent in the sealability at high temperatures.

The storage elastic modulus (E') at 150° C. of the copolymer is preferably 125 MPa or higher, more preferably 137 MPa or higher, still more preferably 129 MPa or higher and further still more preferably 131 MPa or higher, and preferably 1,000 MPa or lower, more preferably 500 MPa or lower and still more preferably 300 MPa or lower. Due to that the storage elastic modulus (E') at 150° C. of the copolymer is in the above range, there can be obtained the copolymer giving molded articles which can continuously exhibit a sufficient rebound resilience also at high temperatures for a long term, and are excellent in the crack resistance at high temperatures and the sealability at high temperatures.

The storage elastic modulus (E') can be measured by carrying out a dynamic viscoelasticity measurement under the condition of a temperature-increasing rate of 2° C./min and a frequency of 10 Hz and in the range of 30 to 250° C. The storage elastic modulus (E') at 150° C. can be raised by regulating the content of the PPVE unit and the melt flow rate (MFR) of the copolymer.

The surface pressure at 150° C. of the copolymer is preferably 0.60 MPa or higher, more preferably 0.65 MPa or higher and still more preferably 0.70 MPa or higher; the upper limit is not limited, but may be 2.0 MPa or lower. The surface pressure at 150° C. of the copolymer can be raised by regulating the content of the PPVE unit, the melt flow rate (MFR) and the number of functional groups of the copolymer.

The surface pressure can be determined as follows. A test piece obtained from the copolymer is deformed at a compression deformation rate of 50%, allowed to stand as is at 150° C. for 18 hours, released from the compressive state and allowed to stand at room temperature for 30 min, and thereafter, the height of the test piece (height of the test piece after being compressively deformed) is measured; and the surface pressure can be calculated by the following formula using the height of the test piece after being compressively deformed, and the storage elastic modulus (MPa) at 150° C.

$$\text{surface pressure at 150° C. (MPa)} = (t_2 - t_1)/t_1 \times E'$$

t$_1$: an original height (mm) of a test piece before being compressively deformed×50% t$_2$: a height (mm) of the test piece after being compressively deformed

E': a storage elastic modulus (MPa) at 150° C.

The amount of recovery at 150° C. of the copolymer can be measured by the same method as in the measurement of the surface pressure. The amount of recovery at 150° C. of a molded article is, in the case where a test piece is deformed at a compression deformation rate of 50%, a difference (t$_2$−t$_1$) between a height (t$_2$) of the test piece after being compression deformed and an original height (t$_1$) of the test piece before being compression deformed. The amount of recovery at 150° C. of a molded article can be made large by regulating the content of the PPVE unit and the melt flow rate (DER) of the copolymer.

The carbon dioxide permeability coefficient of the copolymer is preferably 55 cm$^3$·mm/(m$^2$h·atm) or higher and more preferably 58 cm$^3$·mm/(m$^2$h·atm) or higher. It has been found that by regulating the content of the PPVE unit and the melt flow rate (MFR) of the copolymer, and introducing a relatively large number of functional groups to the copolymer, there can be obtained the copolymer having a relatively high carbon dioxide permeability coefficient. Therefore, by forming a cap of a storage container by using such a copolymer, the drying of a sample such as fungi stored in the storage container can be suppressed while the detention of carbon dioxide in the storage container is suppressed.

In the present disclosure, the carbon dioxide permeability coefficient can be measured under the condition of a test temperature of 70° C. and a test humidity of 0% RH. The specific measurement of the carbon dioxide permeability coefficient can be carried out by a method described in Examples.

The copolymer of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

dialkyl peroxycarbonates such as di-n-propyl peroxydicarbonate, diisopropyl peroxydicarbonate, di-sec-butyl peroxydicarbonate and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro(or fluorochloro)acyl] peroxides.

The di[fluoro(or fluorochloro)acyl] peroxides include diacyl peroxides represented by $[(RfCOO)-]_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichloroctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, peiphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFCLCF_2CF_3$ and $CF_3CFClCFClCF_3$; hydrofluoroalkanes such as $CF_3CFHCFHCF_2CF_2CF_3$, $CF_2HCF_2CF_2CF_2CF_2H$ and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2CCH_2F$, $(CF_3)_2CHCF_2OCH_3$, $CF_3CF_2CH_2CCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be famed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH₃, —CH₂OH, —COF, —CFF₂ and —CONH₂, and thermally relatively stable functional groups thereof, such as —CF₂H, can be converted to thermally very stable —CF₃. Consequently, the total number (number of functional groups) of —COOH, —COOCH₃, —CH₂OH, —COF, —CF=CF₂, —CONH₂ and —CF₂H of the copolymer can easily be controlled in the above-mentioned range.

The fluorine-containing compound is not limited, but includes fluorine radical sources generating fluorine radicals under the fluorination treatment condition. The fluorine radical sources include F₂ gas, CoF₃, AgF₂, UF₆, OF₂, N₂F₂, CF₃OF, halogen fluorides (for example, IF₅ and ClF₃).

The fluorine radical source such as F₂ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas (F₂ gas).

A composition may be obtained by mixing the copolymer of the present disclosure and as required, other components. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

A method of producing the composition includes a method of dry mixing the copolymer and the other components, and a method of previously mixing the copolymer and the other components by a mixer and then melt kneading the mixture by a kneader, melt extruder or the like.

The copolymer of the present disclosure or the above-mentioned composition can be used as a processing aid, a molding material and the like, but use as a molding material is suitable. Further, there can also be utilized aqueous dispersions, solutions and suspensions of the copolymer of the present disclosure, and the copolymer/solvent-based materials; and these can be used for application of coating materials, encapsulation, impregnation, and casting of films. However, since the copolymer of the present disclosure has the above-mentioned properties, it is preferable to use the copolymer as the molding material.

Molded articles may be obtained by molding the copolymer of the present disclosure or the above composition.

A method of molding the copolymer or the composition is not limited, and includes injection molding, extrusion forming, compression molding, blow molding, transfer molding, rotomolding and rotolining molding. As the molding method, among these, preferable are compression molding, injection molding, extrusion forming and transfer molding; from the viewpoint of being able of producing molded articles in a high productivity, more preferable are injection molding and extrusion forming and still more preferable is injection molding. That is, it is preferable that molded articles are compression molded articles, injection molded articles, extrusion famed article, or transfer molded articles; and from the viewpoint of being able to produce molded articles in a high productivity, being injection molded articles or extrusion famed article is more preferable, and being injection molded articles is still more preferable.

The shapes of the molded articles are not limited, and may be shapes of, for example, hoses, pipes, tubes, electric wire coatings, sheets, seals, gaskets, packings, films, tanks, rollers, bottles, containers and sealing tools (caps).

The copolymer of the present disclosure, the above composition and the above molded articles can be used, for example, in the following applications.

Food packaging films, and members for liquid transfer for food production apparatuses, such as lining materials of fluid transfer lines, packings, sealing materials and sheets, used in food production processes; chemical stoppers and packaging films for chemicals, and members for chemical solution transfer, such as lining materials of liquid transfer lines, packings, sealing materials and sheets, used in chemical production processes;

inner surface lining materials of Chemical solution tanks and piping of chemical plants and semiconductor factories;

members for fuel transfer, such as O (square) rings, tubes, packings, valve stem materials, hoses and sealing materials, used in fuel systems and peripheral equipment of automobiles, and such as hoses and sealing materials, used in ATs of automobiles;

members used in engines and peripheral equipment of automobiles, such as flange gaskets of carburetors, shaft seals, valve stem seals, sealing materials and hoses, and other vehicular members such as brake hoses, hoses for air conditioners, hoses for radiators, and electric wire coating materials;

members for chemical transfer for semiconductor production apparatuses, such as O (square) rings, tubes, packings, valve stem materials, hoses, sealing materials, rolls, gaskets, diaphragms and joints;

members for coating and inks, such as coating rolls, hoses and tubes, for coating facilities, and containers for inks;

members for food and beverage transfer, such as tubes, hoses, belts, packings and joints for food and beverage, food packaging materials, and members for glass cooking appliances;

members for waste liquid transport, such as tubes and hoses for waste transport;

members for high-temperature liquid transport, such as tubes and hoses for high-temperature liquid transport;

members for steam piping, such as tubes and hoses for steam piping; corrosion proof tapes for piping, such as tapes wound on piping of decks and the like of ships;

various coating materials, such as electric wire coating materials, optical fiber coating materials, and transparent front side coating materials installed on the light incident side and back side lining materials of photoelectromotive elements of solar cells;

diaphragms and sliding members such as various types of packings of diaphragm pumps;

films for agriculture, and weathering covers for various kinds of roof materials, sidewalls and the like;

interior materials used in the building field, and coating materials for glasses such as non-flammable fireproof safety glasses; and lining materials for laminate steel sheets used in the household electric field.

The fuel transfer members used in fuel systems of automobiles further include fuel hoses, filler hoses and evap hoses. The above fuel transfer members can also be used as fuel transfer members for gasoline additive-containing fuels, resultant to sour gasoline, resultant to alcohols, and resultant to methyl tertiary butyl ether and amines and the like.

The above chemical stoppers and packaging films for chemicals have excellent chemical resistance to acids and the like. The above chemical solution transfer members also include corrosion proof tapes wound on chemical plant pipes.

The above molded articles also include vehicular radiator tanks, chemical solution tanks, bellows, spacers, rollers and gasoline tanks, waste solution transport containers, high-temperature liquid transport containers and fishery and fish farming tanks.

The above molded articles further include members used for vehicular bumpers, door trims and instrument panels, food processing apparatuses, cooking devices, water- and oil-repellent glasses, illumination-related apparatuses, display boards and housings of OA devices, electrically illuminated billboards, displays, liquid crystal displays, cell phones, printed circuit boards, electric and electronic components, sundry goods, dust bins, bathtubs, unit baths, ventilating fans, illumination frames and the like.

Due to that molded articles containing the copolymer of the present disclosure are very excellent in the water vapor low permeability and excellent in the sealability at high temperatures, and even in the case of contacting with chemicals, hardly cause cracks, the molded articles can suitably be utilized as members to be compressed containing the copolymer. Molded articles containing the copolymer of the present disclosure, since being excellent in the crack resistance at high temperatures, even in the case of being made into thick-wall molded articles, hardly generate cracks.

The members to be compressed of the present disclosure, even when being deformed at a high compression deformation rate, exhibit a high surface pressure. The members to be compressed of the present disclosure can be used in a state of being compressed at a compression deformation rate of 10% or higher, and can be used in a state of being compressed at a compression deformation rate of 20% or higher or 25% or higher. By using the members to be compressed of the present disclosure by being deformed at such a high compression deformation rate, a certain rebound resilience can be retained for a long term and the sealing property and the insulating property can be retained for a long tam.

The members to be compressed of the present disclosure, even when being deformed at a high temperature and at a high compression deformation rate, exhibit a high storage elastic modulus and a large amount of recovery and a high surface pressure. The members to be compressed of the present disclosure can be used at 150° C. or higher and in a state of being compression deformed at a compression deformation rate of 10% or higher, and can be used at 150° C. or higher and in a state of being compression deformed at a compression deformation rate of 20% or higher or 25% or higher. By using the members to be compressed of the present disclosure by being deformed at such a high temperature and at such a high compression deformation rate, a certain rebound resilience can be retained also at high temperatures for a long term and the sealing property and the insulating property at high temperatures can be retained for a long tam.

In the case where the members to be compressed are used in a state of being compressed, the compression deformation rate is a compression deformation rate of a portion having the highest compression deformation rate. For example, in the case where a flat member to be compressed is used in a state of being compressed in the thickness direction, the compression deformation rate is that in the thickness direction. Further for example, in the case where a member to be compressed is used with only some portions of the member in a state of being compressed, the compression deformation rate is that of a portion having the highest compression deformation rate among compression deformation rates of the compressed portions.

The size and shape of the members to be compressed of the present disclosure may suitably be set according to applications, and are not limited. The shape of the members to be compressed of the present disclosure may be, for example, annular. The members to be compressed of the present disclosure may also have, in plan view, a circular shape, an elliptic shape, a coiner-rounded square or the like, and may be a shape having a throughhole in the central portion thereof.

It is preferable that the members to be compressed of the present disclosure are used as members constituting non-aqueous electrolytic solution batteries. Due to that the members to be compressed of the present disclosure are very excellent in the water vapor low permeability and excellent in the sealability at high temperatures, and even in the case of contacting with chemicals, hardly cause cracks, the members to be compressed are especially suitable as members to be used in a state of contacting with a non-aqueous electrolytic solution in non-aqueous electrolytic solution batteries. That is, the members to be compressed of the present disclosure may also be ones having a liquid-contact surface with a non-aqueous electrolytic solution in the non-aqueous electrolytic solution batteries.

The members to be compressed of the present disclosure hardly make water vapor to penetrate. Therefore, by using the members to be compressed of the present disclosure, the permeation of water vapor from the outside to secondary batteries can be suppressed. Consequently, by using the members to be compressed of the present disclosure, the deterioration of the battery performance and the shortening of the service life of non-aqueous electrolytic solution batteries can be suppressed.

The water vapor permeability of the members to be compressed of the present disclosure is, from the viewpoint that the deterioration of the battery performance and the shortening of the service life of non-aqueous electrolytic solution batteries can be more suppressed, preferably 8.2 g·cm/m$^2$ or lower and more preferably 8.1 g·cm/m$^2$ or lower. The water vapor permeability can be measured under the condition of a temperature of 95° C. and for 30 days.

The non-aqueous electrolytic solution batteries are not limited as long as being batteries having a non-aqueous electrolytic solution, and examples thereof include lithium ion secondary batteries and lithium ion capacitors. Members constituting the non-aqueous electrolytic solution batteries include sealing members and insulating members.

For the non-aqueous electrolytic solution, one or two or more of well-known solvents can be used such as propylene carbonate, ethylene carbonate, butylene carbonate, γ-butyl-lactone, 1,2-dimethoxyethane, 1,2-diethoxyethane, dimethyl carbonate, diethyl carbonate and ethyl methyl carbonate. The non-aqueous electrolytic solution batteries may further have an electrolyte. The electrolyte is not limited, but may be LiClO$_4$, LiAsF$_6$, LiPF$_6$, LiBF$_4$, LiCl, LiBr, CH$_3$SO$_3$Li, CF$_3$SO$_3$Li, cesium carbonate and the like.

The members to be compressed of the present disclosure can suitably be utilized, for example, as sealing members such as sealing gaskets and sealing packings, and insulating members such as insulating gaskets and insulating packings. The sealing members are members to be used for preventing leakage of a liquid or a gas, or penetration of a liquid or a gas from the outside. The insulating members are members to be used for insulating electricity. The members to be compressed of the present disclosure may also be members to be used for the purpose of both of sealing and insulation.

The members to be compressed of the present disclosure, due to being excellent in the heat resistance and excellent in the crack resistance and the sealability at high temperatures, can suitably be used under an environment of becoming high temperatures. The copolymer of the present disclosure, since being excellent in the crack resistance and even in the case of being made into thick-wall molded articles, hardly causes cracks, can suitably be used as thick-wall members to be compressed, for example, thick-wall gaskets. It is suitable for the members to be compressed of the present disclosure to be used, for example, in an environment where the maximum temperature becomes 40° C. or higher. It is suitable for the members to be compressed of the present disclosure to be used, for example, in an environment where the maximum temperature becomes 150° C. or higher. Examples of the case where the temperature of the members to be compressed of the present disclosure may become such high temperatures include the case where after a member to be compressed is installed in a state of being compressed to a battery, other battery members are installed to the battery by welding, and the case where a non-aqueous electrolytic solution battery generates heat.

Due to that the members to be compressed of the present disclosure can be obtained as injection molded articles excellent in the surface smoothness by injection molding in a high productivity, and are very excellent in the water vapor low permeability and excellent in the sealability at high temperatures, and even in the case of contacting with chemicals, hardly cause cracks, the members to be compressed can suitably be used as sealing members for non-aqueous electrolytic solution batteries or insulating members for non-aqueous electrolytic solution batteries. For example, in the charge time of batteries such as non-aqueous electrolytic solution secondary batteries, the temperature of the batteries temporarily becomes 40° C. or higher, specially temporarily becomes 150° C. or higher in some cases. Even when the members to be compressed of the present disclosure are used by being deformed at high temperatures and at a high compression deformation rate, and moreover are brought into contact with non-aqueous electrolytic solutions at high temperatures, in batteries such as non-aqueous electrolytic solution batteries, a high rebound resilience is not impaired. Therefore, the members to be compressed of the present disclosure, in the case of being used as sealing members, have the excellent sealing property and retain the sealing property for a long tam. Further, the members to be compressed of the present disclosure, due to containing the above copolymer, have the excellent insulating property. Therefore, in the case of using the members to be compressed of the present disclosure as insulating members, the member firmly adhere to two or more electrically conductive members and prevent short circuit over a long tam.

The copolymer of the present disclosure, due to that the dielectric loss tangent at 6 GHz is low, can suitably be utilized as a material for products for high-frequency signal transmission.

The products for high-frequency signal transmission are not limited as long as being products to be used for transmission of high-frequency signals, and include (1) molded boards such as insulating boards for high-frequency circuits, insulating materials for connection parts and printed circuit boards, (2) molded articles such as bases of high-frequency vacuum tubes and antenna covers, and (3) coated electric wires such as coaxial cables and LAN cables. The products for high-frequency signal transmission can suitably be used in devices utilizing microwaves, particularly microwaves of 3 to 30 GHz, in satellite communication devices, cell phone base stations, and the like.

In the products for high-frequency signal transmission, the copolymer of the present disclosure can suitably be used as an insulator in that the dielectric loss tangent is low.

As the (1) molded boards, printed wiring boards are preferable in that the good electric property is provided. The printed wiring boards are not limited, but examples thereof include printed wiring boards of electronic circuits for cell phones, various computers, communication devices and the like. As the (2) molded articles, antenna covers are preferable in that the dielectric loss is low.

As the (3) coated electric wires, preferable are coated electric wires having a coating layer containing the copolymer of the present disclosure. That is, molded articles containing the copolymer of the present disclosure can suitably be utilized as coating layers containing the copolymer.

Since the copolymer of the present disclosure has a high storage elastic modulus (E'), the coating layer containing the copolymer can withstand long-term use.

Further, the coating layer with few defects can be famed from the copolymer of the present disclosure, and the copolymer hardly corrodes core wires to be coated, hardly generates molding defects such as an increase in the number of defects such as generating sparks, and is excellent also in the electric property. Therefore, the coated electric wire having the coating layer containing the copolymer of the present disclosure is excellent in the electric property and is excellent also in the insulating property of the coating layer. Since the coating layer hardly softens even at high temperatures, the electric property excellent even at high temperatures can be retained.

A commercially available tetrafluoroethylene/fluoro(alkyl vinyl ether) copolymer is known to have a continuous use-temperature of 260° C. The continuous use-temperature means the highest operating temperature which a polymer can withstand continuously.

In recent years, copolymers have been needed which can be used in a severer working environment, in other words, have a continuous use-temperature exceeding 260° C. In many industrial applications in oil fields and gas fields, there has been arising the necessity of having a melt-fabricable polymer material having a continuous use-temperature exceeding 260° C. in order to withstand an extremely high working temperature encountered in construction work and the like. For example, in the case of carrying out deep excavation, the data communication cable may possibly be exposed to a temperature of 280° C. or higher in a downhole winze.

The molded articles containing the copolymer of the present disclosure enable having a continuous use-temperature of 280° C. The molded articles containing the copolymer of the present disclosure do not melt even at a very high temperature of 280° C.; and the coating layers composed of the molded articles hold the coating without forming rupture and cracking caused by a thermal load, and can be used continuously. Hence, the molded articles containing the copolymer of the present disclosure are suitable to use as the coating layers of the coated electric wires to be used in an environment where the maximum temperature becomes 280° C. or higher.

The coated electric wire has a core wire, and the coating layer installed on the periphery of the core wire and containing the copolymer of the present disclosure. The coated electric wires, due to that the coating layer has excellent heat resistance and a low dielectric loss tangent, are suitable to high-frequency transmission cables, flat cables, heat-resistant cables and the like, and particularly to high-frequency transmission cables.

As a material for the core wire, for example, a metal conductor material such as copper or aluminum can be used. The core wire is preferably one having a diameter of 0.02 to 3 mm. The diameter of the core wire is more preferably 0.04 mm or larger, still more preferably 0.05 mm or larger and especially preferably 0.1 mm or larger. The diameter of the core wire is more preferable 2 mm or smaller.

With regard to specific examples of the core wire, there may be used, for example, AWG (American Wire Gauge)-46 (solid copper wire of 40 μm in diameter), AWG-26 (solid copper wire of 404 μm in diameter), AWG-24 (solid copper wire of 510 μm in diameter), and AWG-22 (solid copper wire of 635 μm in diameter).

The coating layer is preferably one having a thickness of 0.1 to 3.0 mm. It is also preferable that the thickness of the coating layer is 2.0 mm or smaller.

The high-frequency transmission cables include coaxial cables. The coaxial cables generally have a structure configured by laminating an inner conductor, an insulating coating layer, an outer conductor layer and a protective coating layer in order from the core part to the peripheral part. A molded article containing the copolymer of the present disclosure can suitably be utilized as the insulating coating layer containing the copolymer. The thickness of each layer in the above structure is not limited, but is usually: the diameter of the inner conductor is approximately 0.1 to 3 mm; the thickness of the insulating coating layer is approximately 0.3 to 3 mm; the thickness of the outer conductor layer is approximately 0.5 to 10 mm; and the thickness of the protective coating layer is approximately 0.5 to 2 mm.

Alternatively, the coating layer may be one containing cells, and is preferably one in which cells are homogeneously distributed.

Since the copolymer of the present disclosure has an MFR in the specific range, for example, in preparation of a coated electric wire having a coating layer containing the copolymer, in the case where the coating layer contains cells, the generation of sparks can be suppressed and the foaming ratio can be made high; therefore, the case is preferable. The coating layer with high foaming ratio and few defects can be famed.

The average cell size of the cells is not limited, but is, for example, preferably 60 μm or smaller, more preferably 45 μm or smaller, still more preferably 35 μm or smaller, further still more preferably 30 μm or smaller, especially preferable 25 μm or smaller and further especially preferably 23 μm or smaller. Then, the average cell size is preferably 0.1 μm or larger and more preferably 1 μm or larger. The average cell size can be determined by taking an electron microscopic image of an electric wire cross section, calculating the diameter of each cell and averaging the diameters.

The foaming ratio of the coating layer may be 20% or higher, and is more preferably 30% or higher, still more preferably 33% or higher and further still more preferably 35% or higher. The upper limit is not limited, but is, for example, 80%. The upper limit of the foaming ratio may be 60%. The foaming ratio is a value determined as ((the specific gravity of an electric wire coating material—the specific gravity of the coating layer)/(the specific gravity of the electric wire coating material)×100. The foaming ratio can suitably be regulated according to applications, for example, by regulation of the amount of a gas, described later, to be injected in an extruder, or by selection of the kind of a gas dissolving.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TEE/HEP-based copolymer, a TEE/PAVE copolymer, a TEE/ethylene-based copolymer, a vinylidene fluoride-based polymer, a polyolefin resin such as polyethylene [PE], or polyvinyl chloride [PVC].

The coated electric wire can be produced, for example, by using an extruder, heating the copolymer, extruding the copolymer in a melt state on the core wire to thereby form the coating layer.

In formation of a coating layer, by heating the copolymer and introducing a gas in the copolymer in a melt state, the coating layer containing cells can be famed. As the gas, there can be used, for example, a gas such as chlorodifluoromethane, nitrogen or carbon dioxide, or a mixture thereof. The gas may be introduced as a pressurized gas in the heated copolymer, or may be generated by mingling a chemical foaming agent in the copolymer. The gas dissolves in the copolymer in a melt state.

So far, embodiments have been described, but it is to be understood that various changes and modifications of patterns and details may be made without departing from the subject matter and the scope of the claims.

According to the present disclosure, there is provided a copolymer comprising tetrafluoroethylene unit, and a perfluoro(propyl vinyl ether) unit, wherein the copolymer has a content of the perfluoro(propyl vinyl ether) unit of 3.4 to 3.9% by mass with respect to the whole of the monomer units, and a melt flow rate of 29 to 36 g/10 min.

functional group per $1\times10^6$ carbon atoms in the sample was calculated according to the following formula (A).

$$N=I\times K/t \tag{A}$$

I: absorbance
K: correction factor
t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

It is preferable that the copolymer of the present disclosure has the number of functional groups of more than 50 per $10^6$ main-chain carbon atoms.

According to the present disclosure, there are provided a sealing tool, injection molded article or member to be compressed containing the above copolymer.

According to the present disclosure, a coated electric wire having a coating layer comprising the above copolymer is further provided.

EXAMPLES

The embodiments of the present disclosure will be described by Examples as follows, but the present disclosure is not limited only to these Examples.

Each numerical value in Examples and Comparative Examples was measured by the following methods.
(Content of a Monomer Unit)

The content of each monomer unit was measured by an NMR analyzer (for example, manufactured by Bruker Bio-Spin GmbH, AVANCE 300, high-temperature probe).
(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.
(Number of Functional Groups)

Pellets of the copolymer was molded by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the (Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.
(Glass Transition Temperature (Tg))

The glass transition temperature (Tg) was determined by carrying out a dynamic viscoelasticity measurement using a dynamic viscoelasticity analyzer DVA-220 (manufactured by IT Keisoku Seigyo K.K.). The measurement was carried out under the condition of a temperature-increasing rate of 2° C./min and a frequency of 10 Hz, and the temperature at the peak of tanδ was determined as the glass transition temperature.

Example 1

51.8 L of pure water was charged in a 174 L-volume autoclave; nitrogen replacement was sufficiently carried out; thereafter, 40.9 kg of perfluorocyclobutane, 1.49 kg of perfluoro(propyl vinyl ether) (PPVE) and 4.00 kg of methanol were charged; and the temperature in the system was held at 35° C. and the stirring speed was held at 200 rpm. Then, tetrafluoroethylene (TFE) was introduced under pressure up to 0.64 MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.036 kg of PPVE was additionally charged for every 1 kg of TFE supplied. When the additionally charged amount of TFE reached 40.9 kg, the polymerization was finished. Unreacted TFE was released to return the pressure in the autoclave to the atmospheric pressure, and thereafter, an obtained reaction product was washed with water and dried to thereby obtain 42.4 kg of a powder.

The obtained powder was melt extruded at 360° C. by a screw extruder (trade name: PCM46, manufactured by Ike-gai Co p) to thereby obtain pellets of a TEE/PPVE copolymer. By using the obtained pellets, various physical properties were measured by the methods described above.

Example 2

Pellets were obtained as in Example 1, except for changing the charged amount of PPVE to 1.55 kg, changing the charged amount of methanol to 4.30 kg and changing the additionally charged amount of PPVE for every 1 kg of TFE supplied to 0.037 kg.

Example 3

Pellets were obtained as in Example 1, except for changing the charged amount of PPVE to 1.60 kg, changing the charged amount of methanol to 3.90 kg and changing the additionally charged amount of PPVE for every 1 kg of TFE supplied to 0.038 kg, to obtain 42.5 kg of a dry powder.

Example 4

Pellets were obtained as in Example 1, except for changing the charged amount of PPVE to 1.66 kg, changing the charged amount of methanol to 3.59 kg and changing the additionally charged amount of PPVE for every 1 kg of TFE supplied to 0.040 kg, to obtain 42.5 kg of a dry powder.

Example 5

26.6 L of pure water was charged in a 174 L-volume autoclave; nitrogen replacement was sufficiently carried out; thereafter, 30.4 kg of perfluorocyclobutane, 0.93 kg of perfluoro(propyl vinyl ether) (PPVE) and 4.51 kg of methanol were charged; and the temperature in the system was held at 35° C. and the stirring speed was held at 200 rpm. Then, tetrafluoroethylene (TFE) was introduced under pressure up to 0.58 MPa, and thereafter 0.021 kg of a 50% methanol solution of di-n-propyl peroxydicarbonate was charged to initiate polymerization. Since the pressure in the system decreased along with the progress of the polymerization, TFE was continuously supplied to make the pressure constant, and 0.035 kg of PPVE was added for every 1 kg of TFE supplied and the polymerization was continued for 8 hours. TFE was released to return the pressure in the autoclave to the atmospheric pressure, and thereafter, an obtained reaction product was washed with water and dried to thereby obtain 15 kg of a powder.

The obtained powder was melt extruded at 360° C. by a screw extruder (trade name: PCM46, manufactured by Ike-gai Corp.) to thereby obtain pellets of a TEE/PPVE copolymer. The PPVE content of the obtained pellets was measured by the method described above. The result is shown in Table 3.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above. The results are shown in Table 3.

Comparative Example 1

Pellets were obtained as in Example 1, except for changing the charged amount of PPVE to 1.29 kg, changing the charged amount of methanol to 4.72 kg and changing the additionally charged amount of PPVE for every 1 kg of TFE supplied to 0.033 kg, to obtain 42.3 kg of a dry powder.

Comparative Example 2

Pellets were obtained as in Example 1, except for changing the charged amount of PPVE to 1.85 kg, changing the charged amount of methanol to 3.46 kg and changing the additionally charged amount of PPVE for every 1 kg of TFE supplied to 0.043 kg, to obtain 42.6 kg of a dry powder.

Comparative Example 3

Pellets were obtained as in Example 1, except for changing the charged amount of PPVE to 1.55 kg, changing the charged amount of methanol to 4.88 kg and changing the additionally charged amount of PPVE for every 1 kg of TFE supplied to 0.037 kg.

Comparative Example 4

Pellets were obtained as in Example 1, except for changing the charged amount of PPVE to 1.66 kg, changing the charged amount of methanol to 3.10 kg and changing the additionally charged amount of PPVE for every 1 kg of TFE supplied to 0.040 kg, to obtain 42.5 kg of a dry powder.

By using the pellets obtained in the Examples and Comparative Examples, various physical properties were measured by the methods described above. The results are shown in Table 3.

TABLE 3

| | PPVE content (mass %) | MFR (g/10 min) | Number of functional groups (number/ $C10^6$) | Melting point (° C.) | Glass transition temperature (° C.) |
|---|---|---|---|---|---|
| Example 1 | 3.5 | 30.0 | 301 | 308 | 97.5 |
| Example 2 | 3.6 | 34.0 | 312 | 307 | 97.0 |
| Example 3 | 3.7 | 32.0 | 307 | 307 | 96.5 |
| Example 4 | 3.8 | 31.0 | 304 | 306 | 96.0 |
| Example 5 | 3.4 | 32.0 | <6 | 309 | 97.5 |
| Comparative Example 1 | 3.2 | 33.0 | 310 | 309 | 98.0 |
| Comparative Example 2 | 4.1 | 32.5 | 308 | 304 | 95.5 |
| Comparative Example 3 | 3.6 | 40.0 | 327 | 307 | 96.5 |
| Comparative Example 4 | 3.8 | 27.0 | 292 | 306 | 96.0 |

The description of "<6" in Table 3 means that the number of functional groups is less than 6.

Then, by using the obtained pellets, the following properties were evaluated. The results are shown in Table 4.

(Water Vapor Permeability)

By using the pellets and a heat press molding machine, a sheet-shape test piece of approximately 0.2 mm in thickness was prepared. 18 g of water was put in a test cup (permeation area: 12.56 $cm^2$), and the test cup was covered with the sheet-shape test piece; and a PTFE gasket was pinched and fastened to hermetically close the test cup. The sheet-shape test piece was brought into contact with the water, and held at a temperature of 95° C. for 30 days, and thereafter, the test cup was taken out and allowed to stand at room temperature for 2 hours; thereafter, the amount of the mass lost was measured. The water vapor permeability (g·cm/$m^2$) was determined by the following formula.

Water vapor permeability (g·cm/$m^2$)=the amount of the mass lost (g)×the thickness of the sheet-shape test piece (cm)/the permeation area ($m^2$)

(Storage Elastic Modulus (E'))

The storage elastic modulus (E') was determined by carrying out a dynamic viscoelasticity measurement using a DVA-220 (manufactured by IT Keisoku Seigyo K.K.). By using, as a sample test piece, a heat press molded sheet of 25 mm in length, 5 mm in width and 0.2 mm in thickness, the measurement was carried out under the condition of a temperature-increasing rate of 2° C./min, and a frequency of 10 Hz, and in the range of 30° C. to 250° C., and the storage elastic modulus (MPa) at 150° C. was identified.

(Amount of Recovery)

Approximately 2 g of the pellets was charged in a metal mold (inner diameter: 13 mm, height: 38 ran), and in that state, melted by hot plate press at 370° C. for 30 min, thereafter, water-cooled under a pressure of 0.2 MPa (resin pressure) to thereby prepare a molded article of approximately 8 mm in height. Thereafter, the obtained molded article was cut to prepare a test piece of 13 mm in outer diameter and 6 mm in height.

The prepared test piece was compressed to a compression deformation rate of 50% (that is, the test piece of 6 mm in height was compressed to a height of 3 mm) at a normal temperature by using a compression device. The compressed test piece fixed on the compression device was allowed to stand still in an electric furnace at 150° C. for 18 hours. The compression device was taken out from the electric furnace, and cooled to room temperature; thereafter, the test piece was dismounted. The recovered test piece was allowed to stand at room temperature for 30 min and the height of the recovered test piece was measured and the amount of recovery was determined by the following formula.

Amount of recovery (mm)=$t_2$−$t_1$ $t_1$: the height of a spacer (mm)
$t_2$: the height of the test piece dismounted from the compression device (mm)

In the above test, $t_1$ was 3 mm.

(Surface pressure at 150° C.)

The surface pressure at 150° C. was determined by the following formula from the result of the compression test at 150° C. and the result of the storage elastic modulus measurement at 150° C.

Surface pressure at 150° C. (MPa): ($t_2$−$t_1$)/$t_1$×E'

$t_1$: the height of a spacer (mm)
$t_2$: the height of the test piece dismounted from the compression device (mm)
E': the storage elastic modulus at 150° C. (MPa)

(Carbon Dioxide Permeability Coefficient)

By using the pellets and a heat press molding machine, a sheet-shape test piece of approximately 0.1 mm in thickness was prepared. By using the obtained test piece, the measurement of the carbon dioxide transmission rate was carried out according to JIS K7126-1:2006 by using a differential-pressure type gas permeation analyzer (L100-5000 type, manufactured by Systech illinois Ltd.). There was obtained a numerical value of the carbon dioxide transmission rate with a permeation area of 50.24 $cm^2$ at a test temperature of 70° C. and at a test humidity of 0% RH. By using the obtained carbon dioxide transmission rate and the thickness of the test piece, the carbon dioxide permeability coefficient was calculated by the following formula.

Carbon dioxide permeability coefficient ($cm^3$ mm/($m^2$h·atm))=GTR×$d$

GTR: the carbon dioxide transmission rate ($cm^3$/($m^2$h·atm))
d: the thickness of the test piece (mm)

(Chemical Immersion Crack Test)

A sheet of approximately 2 mm in thickness was prepared by using the pellets and a heat press molding machine. The obtained sheet was punched out by using a rectangular dumbbell of 13.5 mm×38 mm to obtain 3 test pieces. A notch was famed on the middle of a long side of the each obtained test piece according to ASTM D1693 by a blade of 19 mm×0.45 mm. Three notched test pieces and 25 g of ethanol were put in a 100-mL polypropylene-made bottle, and heated in an electric furnace at 60° C. for 720 hours; and thereafter, the notched test pieces were taken out. Then, the three notched test pieces were mounted on a stress crack test jig according to ASTM D1693, and the notches and their vicinities were visually observed and the number of cracks was counted.

Good: the number of cracks was 0
Poor: the number of cracks was 1 or more (Electric Wire Coating Property)

By using the pellets obtained in each of the Examples and Comparative Examples, and a boron nitride (BN) of 13.5 μm in average particle size, there was prepared by the same method as described in Examples in International Publication No. WO 03/000972, a composition in which the BN content became 0.75% by weight of the total amount of the pellets and the BN.

By using the obtained composition and an extruder for foam forming, a foamed coated electric wire was prepared. The extruder for foam forming was constituted of an extruder and a system manufactured by Hijiri Manufacturing Ltd., a gas injection nozzle manufactured by Micodia, and a crosshead manufactured by UNITEK JAPAN K.K. The screw was equipped with a mixing zone so that nitrogen introduced was homogeneously dispersed.

The capacitance was measured online by using CAPAC300 19C (manufactured by Zumbach Electronic AG). The foaming ratio was managed by the online capacitance.

The extrusion conditions for the electric wire coating were as follows.

a) Core conductor: mild steel wire conductor diameter: 0.6 mm
b) Coating thickness: 0.25 mm
c) Coated electric wire diameter: 1.1 mm
d) Electric wire take-over speed: 80 m/min
e) Extrusion condition:

Cylinder screw diameter=35 mm, a single screw extruder of L/D=32

Die (inner diameter)/tip (outer diameter)=4.7 mm/2.2 mm

Set temperature of the extruder: barrel section C-1 (330° C.), barrel section C-2 (360° C.), barrel section C-3 (370° C.), head section H-1 (375° C.), head section H-2 (365° C.), head section H-3 (360° C.), Set temperature for preheating core wire: 90° C.

f) Nitrogen pressure: 30 MPa g) Nitrogen flow volume: 15 cc/min h) Capacitance: 150±3 pF/m The obtained coated electric wires were evaluated for the number of sparks, as follows.

Sparks were measured online at 1,500 V by using a Beta LaserMike Sparktester HFS1220.

The case where the number of sparks per 4,500 m was 1 was determined as good; the case where 0, as best; and the case where 2 or more, as rejected.

(Surface Smoothness)

The copolymer was injection molded by using an injection molding machine (SE50EV-A, manufactured by Sumitomo Heavy Industries, Ltd.) set at a cylinder temperature of 390° C., a metal mold temperature of 190° C. and an injection speed of 130 mm/s. The metal mold used was a metal mold (4 cavities of 15 mm×15 mm×0.6 mmt) Cr plated on HPM38. The surface of the obtained injection molded article was visually observed and the surface smoothness was evaluated according to the following criteria.

Very Good: no roughness was observed on the surface and the surface was smooth

Good: roughness was observed only on a surface of the portion positioned in the vicinity of the gate of the metal mold Poor: roughness was observed on the most portion of the surface

TABLE 4

| | Water vapor permeability (g · cm/m²) | Storage elastic modulus E'150° C. (MPa) | Amount of recovery (mm) | Surface pressure 150° C. (MPa) | CO₂ permeability coefficient cm³ · mm/ (m² · h · atm) | Chemical immersion crack test | Electric wire coatability (foam coating) Number of sparks | Surface smoothness |
|---|---|---|---|---|---|---|---|---|
| Example 1 | 7.6 | 129 | 0.019 | 0.82 | 58.5 | good | good | good |
| Example 2 | 7.6 | 132 | 0.016 | 0.70 | 58.0 | good | best | very good |
| Example 3 | 7.8 | 131 | 0.016 | 0.70 | 59.4 | good | good | good |
| Example 4 | 7.9 | 129 | 0.017 | 0.73 | 60.2 | good | good | good |
| Example 5 | 7.4 | 136 | 0.022 | 1.00 | 49.2 | good | good | good |
| Comparative Example 1 | 7.2 | 141 | 0.021 | 0.99 | 56.0 | poor | best | very good |
| Comparative Example 2 | 8.0 | 122 | 0.013 | 0.53 | 61.5 | good | good | very good |
| Comparative Example 3 | 7.2 | 134 | 0.012 | 0.54 | 56.8 | poor | best | very good |
| Comparative Example 4 | 8.3 | 127 | 0.019 | 0.80 | 61.2 | good | rejected | poor |

What is claimed is:

1. A copolymer, comprising tetrafluoroethylene unit, and a perfluoro (propyl vinyl ether) unit, wherein the copolymer has a content of the perfluoro (propyl vinyl ether) unit of 3.4 to 3.9% by mass with respect to the whole of the monomer units, has a melt flow rate at 372° C. of 29 to 36 g/10 min, and has a total number of functional groups of —CF=CF₂, —CF₂H, —COF, —COOH, —COOCH₃, —CONH₂ and —CH₂OH of more than 50 and 800 or less per 10⁶ main-chain carbon atoms.

2. A sealing tool, comprising the copolymer according to claim 1.

3. An injection molded article, comprising the copolymer according to claim 1.

4. A member to be compressed, comprising the copolymer according to claim 1.

5. A coated electric wire, comprising a coating layer comprising the copolymer according to claim 1.

* * * * *